United States Patent

[11] 3,593,406

| [72] | Inventors | Robert H. Jones, Jr.;<br>Richard B. Jones, both of c/o J & J Casting, Inc., R.R. #1, Box 267, Hibbing, Minn. 55746 |
|---|---|---|
| [21] | Appl. No. | 861,005 |
| [22] | Filed | Sept. 25, 1969 |
| [45] | Patented | July 20, 1971 |

[54] METHOD OF RECONSTRUCTION OF DIESEL CYLINDER HEADS
9 Claims, 5 Drawing Figs.

[52] U.S. Cl. .................................................. 29/401,
92/169, 123/193
[51] Int. Cl. ............................................. B23d 19/10,
B23p 7/00
[50] Field of Search ......................................... 29/401;
123/193, 195; 241/291, 300.1; 92/169

[56] References Cited
UNITED STATES PATENTS

| 3,449,815 | 6/1969 | Jones, Jr. et al. | 29/401 |
| 3,187,729 | 6/1965 | Morrison | 123/193 X |
| 3,051,279 | 8/1962 | Hougen | 29/401 X |
| 2,996,050 | 8/1961 | Caris | 123/195 X |
| 2,963,015 | 12/1960 | Caris | 123/193 |
| 2,752,668 | 7/1956 | Sheen | 29/401 |

*Primary Examiner*—John F. Campbell
*Assistant Examiner*—Donald P. Rooney
*Attorney*—Wilson & Geppert ABSTRACT: A method of reconstructing worn cylinder heads, where only the inner face of the cylinder head forming a portion of a cylinder for a piston exhibits wear, including the steps of severing the worn portion from the remainder of the cylinder head, providing a new casting to be substituted for the worn portion, preparing the abutting surfaces of the unworn portion of the cylinder head and the new casting, applying a suitable flux to the surfaces, inserting a brazing alloy gasket of a configuration of the cross section of the cylinder head at the line of severance, aligning the parts together, heating the parts and brazing alloy to approximately 1,325° F. for approximately 2 hours, and slowly cooling the bonded parts.

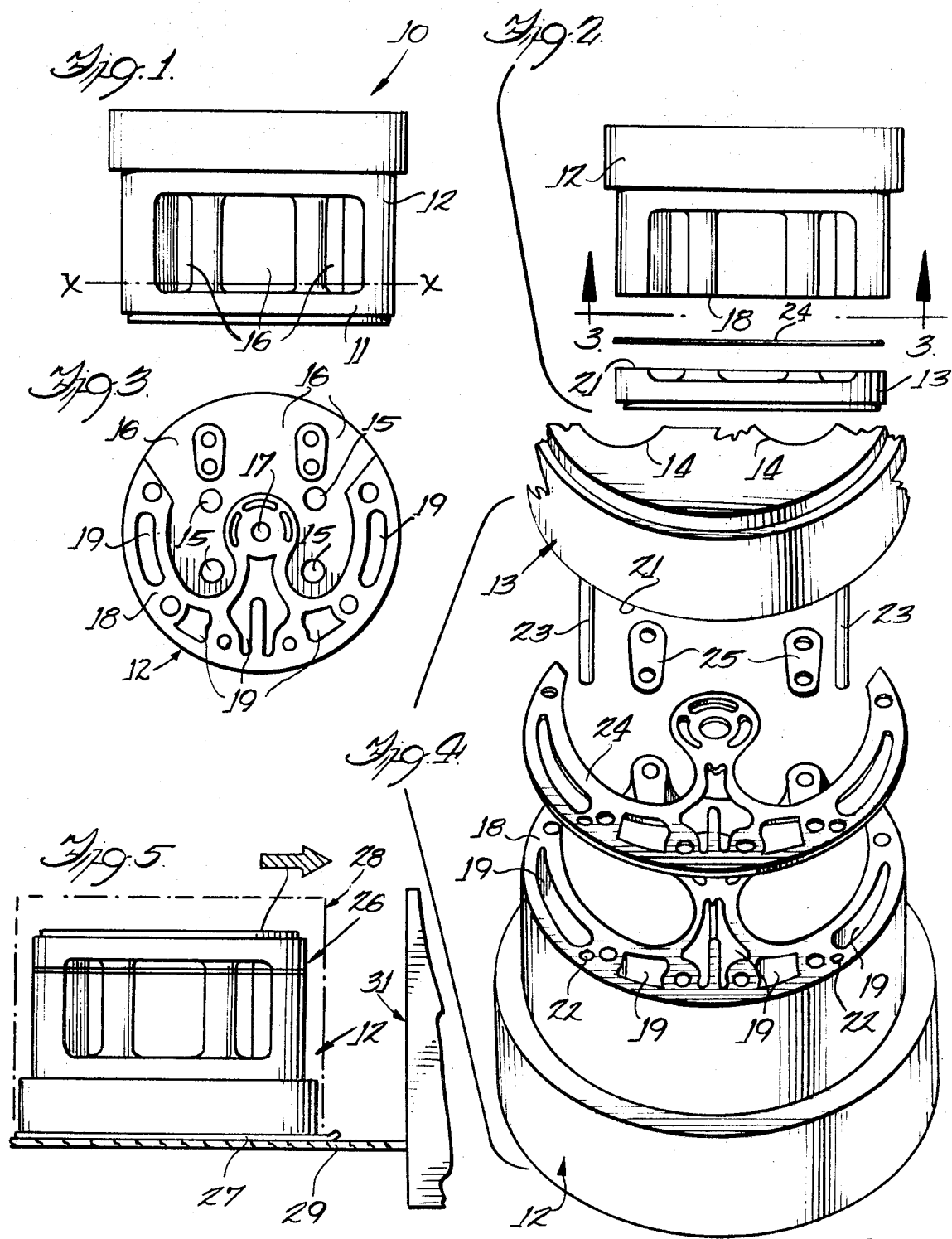

METHOD OF RECONSTRUCTION OF DIESEL CYLINDER HEADS

The present invention relates to the reconstruction of castings and more particularly to an improved method of reconstructing worn castings, such as worn diesel cylinder heads, where only a portion of the casting exhibits wear by replacing the wornout portion.

In our U.S. Pat. No. 3,449,815, issued June 17, 1969, we disclosed a method of reconstructing worn cylinder heads where the worn portion was severed from the remainder of the casting and a new casting portion substituted therefor and bonded to the remainder of the cylinder head by an epoxy adhesive compound. The present invention relates to an improved method of reconstruction where a brazing alloy is used to bond the parts together and provide improved bonding and breaking strength. Also, the improved method eliminates the necessity of a steel sleeve inserted into the injector hole for added strength and alignment of the parts.

Among the objects of the present invention is the provision of a novel method of reconstruction of worn castings, such as diesel cylinder heads, by separating the wornout portion of the casting from that portion that does not exhibit wear, and replacing the wornout portion by bonding a new casting portion, substantially identical in structure to and equal to or of better quality than the wornout portion, to the remainder of the original casting. The bonding of the replacement portion to the remainder of the original cylinder provides greater strength at the bond than in the casting.

Another object of the present invention is the provision of a method of reconstruction of worn castings which is simpler and less expensive than presently used methods. Previously, cracks in a casting were welded and valve seats were built up. Also, the worn face of the cylinder head could be ground or machined down to present a better surface. However, only certain portions of the casting exposed to higher heating were subject to wear and cracking while the remainder of the cylinder head was unchanged. Thus, it was determined that only the worn portion of the cylinder head would be replace with a new casting portion bonded to the remainder of the original cylinder at substantially less cost than replacement with an entirely new cylinder head.

A further object of the present invention is the provision of a method of reconstructing a worn casting where the casting is sawed apart and the wornout portion thereof is scrapped or discarded and the unworn or usable portion of the casting is retained. A new casting portion to replace the wornout portion is prepared to match the retained casting portion and the adjoining surfaces of the casting portions are machined and cleaned. Then a suitable flux is applied to the surfaces and a brazing alloy is sandwiched between the surfaces, and the casting portions are aligned, heated and slowly cooled to provide a proper bond.

The present invention also comprehends the provision of a method of reconstructing castings where the casting portions are bonded with a silver brazing alloy by uniformly heating the aligned casting portions and brazing alloy to a temperature of approximately 1,375° F. for approximately 2 hours and then slowly cooling the casting at a rate of approximately 100° per hour.

Further objects are to provide a process of maximum simplicity, efficiency, economy and ease of operation, and such further objects, advantages and capabilities as will later more fully appear and are inherently possessed thereby.

In the drawing:

FIG. 1 is a side elevational view of a worn or used cylinder head casting with the dotted line showing the plane of separation of the wornout portion from the remainder of the casting.

FIG. 2 is a side elevational view of the unworn portion of the old casting with a new casting portion to be attached thereto to replace the worn part.

FIG. 3 is an end elevational view of the unworn portion of the old casting taken on the line 3–3 of FIG. 2.

FIG. 4 is an enlarged exploded perspective view of the components of the cylinder head showing the assembly of the unworn remainder of the cylinder head, the brazing alloy gasket and the new casting portion.

FIG. 5 is a side elevational view of the assembled reconstructed cylinder head prior to entering the oven.

Referring more particularly to the disclosure in the drawing wherein is shown an illustrative embodiment of a casting that is reconstructed by the novel method of the present invention, FIG. 1 discloses a used casting 10 of a cylinder head having a lower wornout portion 11 containing the valve seats and a relatively unworn upper portion 12. As noted in our U.S. Pat. No. 3,449,815, in diesel head castings and other types of similar castings, certain portions of a casting at or adjacent the valve seat face of a cylinder head exhibit wear while the remaining larger or major portion of the cylinder head does not show any substantial wear. Under prior maintenance practices, where the sealing surface is damaged, it was permissible to rework the head by cutting off up to 0.020 inches of the face. This was considered the absolute limit and if this limit was exceeded, the head would be scrapped due to lack of tolerance.

In the present invention, it has been found that approximately 2⅝ inches of the lower end of the cylinder head can be removed, and a new casting portion 13 identical to the initial structure of this lower worn portion can be bonded to the retained substantially unworn casting portion 12. This upper portion 12 of the original casting does not exhibit any substantial wear and can be reused with the addition of a new casting portion 13 to replace the worn portion 11 without impairing the efficiency and operation of the cylinder head. The cylinder head provides at its inner face the valve seats 14 for valve stems (not shown) extending through passages 15 in the head to control the exhaust passages 15 in the head to control the exhaust passages 16 in the cylinder head, and an injector (not shown), which is a high-pressure fuel metering pump and spray valve combined in a single housing, is conformably received and seated in a tapered central passage 17 in the head.

Now considering the process of reconstruction, the old casting 10 is taken and the worn portion 11, corresponding to the new casting portion 13, is severed from the remaining unworn portion 12 of the used casting 10 along the plane of line X–X (FIG. 1). The severing takes place through the use of a large saw blade having carbide inserts. The unworn portion 12 is then faced and milled to machine the face 18 flat, cleaned internally and the water passages 19 are deburred. The face 21 of the new casting portion 13 is drilled and machined flat to match the requirements of the portion 12 and the casting portions 12, 13 are then matched into pairs. Each pair is then milled on a milling machine with a sensing device to mill out the contour of the new casting portion 13 to meet the contour of the original retained portion 12, and the portion 13 is cored to achieve maximum water flow. This last milling operation provides an improved exhaust flow and eliminates hot spots on the casting.

After the pair of casting portions 12 and 13 are matched and properly machined, a pair of approximately ¼-inch holes 22 are bored in the portions 12 and 13 in aligned relation to receive a pair of positioning dowels or pins 23, 23. After these matching and alignment operations, the faces or surfaces 18 and 21 are cleaned using glass beads under air pressure. A suitable glass bead has been found to be a size 8 bead with an air pressure at approximately 40 p.s.i., although these specifications are not intended to limit the process. The case iron used in the castings has graphite intertwined in the iron which would work against a proper bonded joint, and the glass beads clean out the pores in the cast iron and remove the graphite from the pores so that the bonding compound will enter these pores to provide a much stronger and most effective bond.

The bonding material utilized in this process is a brazing alloy which requires a suitable flux, such as a black flux for brazing produced by Engelhard Industries of Newark, N. J.

The flux is applied by rolling the flux onto the surfaces 18 and 21 for even and complete coverage, although other methods could be used. After application of the flux, the brazing alloy in the form of a stamped or die cut gasket is sandwiched between the surfaces. The brazing alloy is die-cut to size to conform to the configuration of the mating surfaces with a central member 24 and a pair of small members 25, 25; all of the members having suitable openings to receive the securing bolts and openings for the water passages and the positioning dowels.

The brazing alloy is preferably a silver brazing alloy which preferably has approximately the following composition:

| | |
|---|---|
| Silver | 50% ± 1% |
| Copper | 22% ± 1% |
| Zinc | 20% ± 2% |
| Cadmium | 7% ± 1% |
| Tin | 1% ± 0.5% |

This composition has been found to be particularly effective; however, it is not intended that the invention be limited thereby. The thickness of the die cut alloy is approximately 0.005 inches.

The original casting portion 12 and the new casting portion 13 having the flux applied and the dowels 23, 23 inserted into the openings 22, 22 in one portion are positioned with the brazing alloy members 24, 25, 25 sandwiched therebetween and the dowels extend into and align the portions 12 and 13. The assembled casting 26 with the new casting portion 13 on the top is placed on a tray 27 and a shield 28 formed of a metal cylinder with an asbestos lining is placed over the casting 26 to eliminate radiant heat causing uneven heating of the sides of the casting before the inner portion becomes hot enough to prevent burnout of the brazing alloy at the outer diameter prior to the interior reaching the alloy-melting temperature.

The casting 26, tray 27 and shield 28 are positioned on a conveyor 29 and moved through an oven 31. A cylinder head 26 enters the oven every 12 minutes with a heating cycle of 120 minutes. The furnace or oven 31 has two heating zones with a temperature of approximately 1,360°—1,380° F. in the first zone and a temperature of approximately 1,450° F. in the second zone. The furnace achieves a casting temperature of 1,325° F. After arriving at the proper temperature, an atmosphere-controlled heating is used to eliminate oxidation of the brazing alloy. This heating utilizes approximately 2,500 cubic feet of air to 100 cubic feet of propane gas per hour.

A new assembled casting 26 is inserted into the furnace every 12 minutes with six castings in the first zone and four castings in the second and hotter zone. As each head enters the furnace, a completely heated head exits from the furnace to be cooled. If the bonded head cools too rapidly, the exterior cools quicker than the interior of the casting resulting in a pulling action in the center causing a hump of 0.003 to 0.004 inches. To eliminate this problem, the shield 28 is removed and a large metal cylinder (not shown) is dropped over the hot cylinder head and filled with zonilite or mica insulation. The heads are then passed through a cooling chamber to provide cooling at approximately 100° F. per hour until the head reaches room temperature. The cooling operation will occur over a time interval of from 12 to 20 hours.

Once cooled, the head is tested for hardness and boiled for at least 1 hour to remove all excess water-soluble flux from the water passages and the pores, so that cooling water in an engine containing the cylinder head is not contaminated. The use of the silver brazing alloy and the above heating and cooling operations provides a bond of strength of 80,000 pounds per square inch, which is approximately twice the strength of the cast iron in the casting. Thus, under a breakage test, the bond formed by this process exceeded the tensile strength of the cylinder head metal, with the break always occurring in the cast iron.

After boiling out the excess flux, the heads are tested under 120 pounds hydrostatic pressure, checked for alignment of water and boltholes, valve guides are inserted, and the valve seats are ground to the desired tolerance. If there is any discoloration, the head can be grit blasted prior to final checking.

Having thus disclosed our invention, we claim:

1. A method of reconstructing cylinder heads where only a portion of the head exhibits wear, comprising the steps of severing the worn cap of a cylinder head from the remainder of the head, providing a new casting identical to the original form of the severed cap to be substituted therefor, machining the abutting faces of the retained portion and the new casting, cleaning the surfaces to be bonded and applying a suitable flux thereto, aligning and sandwiching a die-cut brazing alloy between the surfaces to be bonded, the alloy conforming to the surface configuration of the castings, heating the assembled casting and brazing alloy to a temperature of approximately 1,325° F. for a time interval of approximately two hours, and slowly cooling the bonded casting to ambient temperature.

2. A method of reconstructing cylinder heads as set forth in claim 1, in which the abutting surfaces are cleaned by glass bead blasting.

3. A method of reconstructing cylinder heads as set forth in claim 1, in which aligned holes are formed in the facing surfaces of the castings, and positioning dowels are inserted into the holes to align the castings with the brazing alloy therebetween for bonding.

4. A method of reconstructing cylinder heads as set forth in claim 1, in which the brazing alloy is a silver brazing alloy having approximately 50 percent silver therein.

5. A method of reconstructing cylinder heads as set forth in claim 1, in which an asbestos-lined cylindrical sleeve is positioned over the assembled casting and brazing alloy to provide for uniform heating of the entire casting.

6. A method of reconstructing cylinder heads as set forth in claim 5, in which the assembled castings are passed through a two-zone oven having an exothermic atmosphere, the first zone tempering the castings entering the oven and the second zone raising the castings to the bonding temperature.

7. A method of reconstructing cylinder heads as set forth in claim 1, in which the bonded castings are slowly cooled at approximately 100° F. per hour until the casting reaches ambient temperature.

8. A method of reconstructing cylinder heads as set forth in claim 7, in which said bonded castings exiting from the furnace are covered with a large metal cylinder, and a surrounding the casting and filling the cylinder with a suitable insulation material to promote uniform cooling.

9. A method of reconstructing cylinder heads as set forth in claim 1, including the step of boiling the cooled bonded castings for approximately one hour to remove excess water-soluble flux.